Nov. 22, 1966   R. BURKHARDT   3,286,575
MICROTOME
Filed Nov. 6, 1964

United States Patent Office 3,286,575
Patented Nov. 22, 1966

3,286,575
MICROTOME
Rolf Burkhardt, Munich-Pasing, Germany, assignor to Compur-Werk Gesellschaft mit beschrankter Haftung & Co., Munich, Germany
Filed Nov. 6, 1964, Ser. No. 409,434
Claims priority, application Germany, Nov. 15, 1963, C 31,419
5 Claims. (Cl. 83—699)

The present invention relates to microtome and more particularly to a means providing a planing knife in place of the usual microtome knife to cut the cover from a preparation prior to being sectioned by the microtome knife.

It is customary in the art to embed the preparation to be sectioned in a cover. This cover comprises a cylindrical sleeve which may be of transparent plastic. Normally the preparation is poured into a central aperature in the sleeve, with the sleeve being closed at one end so that the closed end portion encases the preparation on all sides. Before the actual cutting of sections of the preparation takes place it is necessary to remove this closed end of the sleeve to expose the preparation. If this operation is carried out with the microtome knife it is a time consuming difficult operation as the microtome knife is designed to cut exceedingly thin sections. If a separate tool is used for this purpose there is the difficulty that the plane on which the end portion is removed by the separate tool will not be the same as the plane in which the microtome knife will be cutting so that irregular microtome sections will be formed.

According to the present invention the microtome knife is mounted so that it may be removed and replaced by a preliminary cutting tool such as a planing type blade which is adapted to expeditiously remove the end portion of the holder in which the preparation is encased. The same means are used for adjusting the position of the planing knife as are used for adjusting the position of the microtome knife thus assuring identical angular alignment of both knives.

The present invention provides a microtome having a knife which is mounted on a T shaped clamping bar with means for clamping the knife on this bar. A frame is provided which is adapted to replace the microtome knife on the clamping bar, this frame having a plurality of pins for securely mounting a planing knife thereon. The planing knife may be moved by the means used to position the microtome knife.

An object of the present invention is to provide a microtome with means for replacing the microtome knife with a planing knife for cutting the end portion of a preparation holder prior to cutting the thin sections with the microtome knife.

Other objects and many of the attendant advantages of the present invention will become more readily apparent upon consideration of the following detailed specification wherein.

Figure 1:
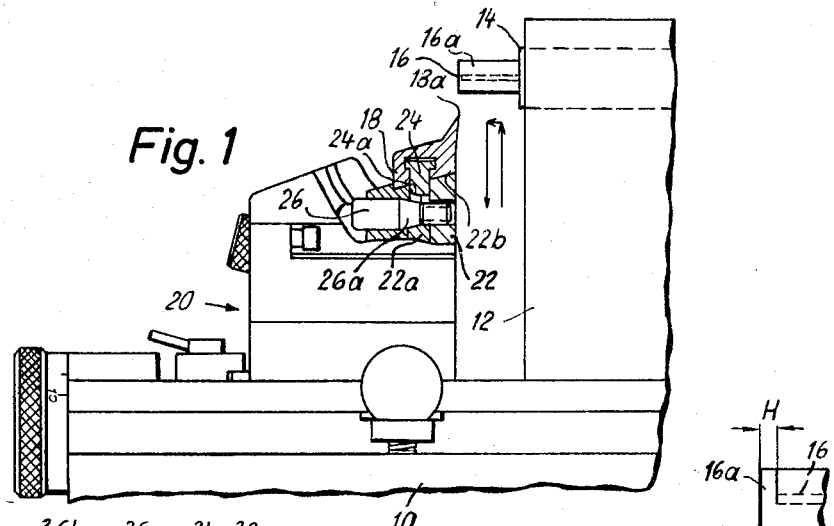
FIGURE 1 is an elevational view of a microtome partly in section.
Figure 2:
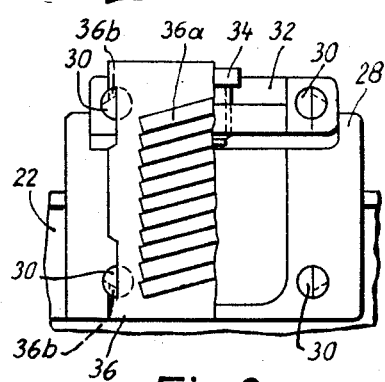
FIGURE 2 is an elevational view showing the planing knife and holder in place of the knife used to cut the preparation into sections.
Figure 3:
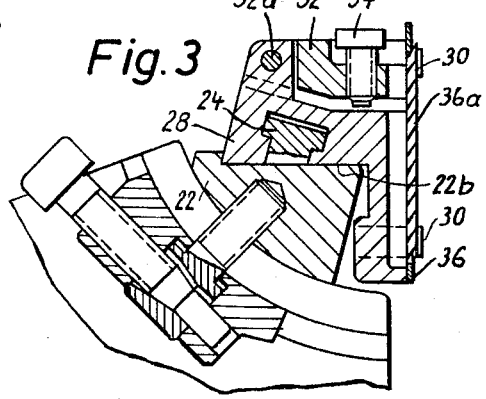
FIGURE 3 is a sectional view showing the planing knife and holder.
Figure 5:
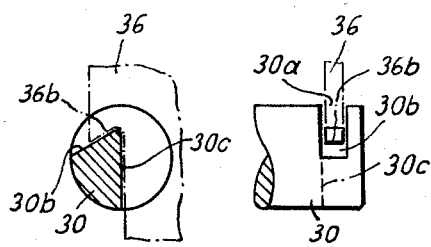
FIGURE 5 is an enlarged detail of a portion of FIGURE 2.
Figure 4:
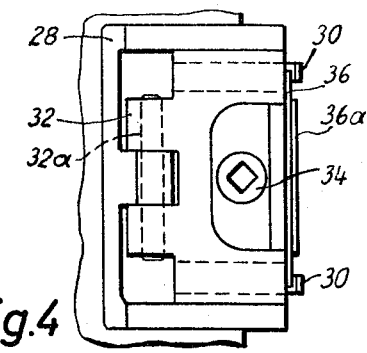
FIGURE 4 is a top plan view of the elements shown in FIGURES 2 and 3.

The microtome is mounted on a base plate 10 and includes a housing 12 with control and driving means (which are not shown and may be conventional) which are used for moving the holder 14 up and down and for shifting the same forward in a cycle which is required in performance of the cutting operation. The holder 14 carries the preparation 16 which is poured into a transparent sleeve 16a of plastic material. The cycle of movement of the holder 14 and the preparation 16 during the cutting operation is diagrammatically depicted in FIGURE 1 by arrows.

The knife used to cut the preparation into ultra-thin sections is designated 18. Its long cutting edge 18a may be formed from the knife body itself in which event the complete knife must be made of high quality material. For reasons of economy, however, this body may be made of a less expensive material and the blade which comprises the cutting edge proper made of high quality material and mounted on this body by means of an adhesive. To set the knife blade 18a in position relatively to the preparation 16 which is best suited to the cutting operation, use is made of an adjusting device which allows for the knife to be adjusted about three axes which intersect at a point, and also allows the knife to be shifted in two rectilinear guideways which intersect each other. This adjusting device has not been illustrated in detail, because it is not essential to the present invention and is omitted for clarity in the drawings. The adjusting means has been shown generally by the reference numeral 20.

Machined in the body 22 of the adjusting means 20, used to incline the knife 18, is a groove 22a and engaging in this groove is a clamping bar 24. The T-shaped head of this bar engages in a longitudinal groove in the knife 18 which has a corresponding cross section. A clamping screw 26 presses against the inner cone 24a of the clamping bar 24, so that when the clamping screw 26 is tightened up the knife 18 is pressed against its holder 22b in the body 22.

In order to carry out the preparatory work prior to cutting sections with the knife 18, this knife is removed from the clamping bar 24 and replaced with a planing knife as shown in FIGURES 2 to 5 inclusive.

A V-shaped frame 28 (FIGURES 2 to 4) is provided and this has a langitudinal groove which is shaped to receive the clamping bar 24, so that it can be inserted and clamped in the holder 22b of the body 22 by means of the clamping screw 26. The frame 28 has two retaining pins 30 and a clamping section 32 which is pivotable about a pin 32a mounted in the frame 28. The clamping section itself carries two further retaining pins 30 and a clamping screw 34, the end portion of which engages the frame 28, as clearly shown in FIGURE 3.

The planing knife is, in the embodiment illustrated, shown as comprising a quadrilateral blade 36 which is provided centrally with a plurality of inclined cutting teeth 36a (FIGURE 2) similar to the blades of a plane used in woodworking. The cutting teeth 36a are arranged on a blade 36 so that they lie serially in the cutting direction. The planing knife 36 has at each of its two longitudinal sides two angular shoulders 36b which co-operate with the clamping pins 30. The end portion of each of the clamping pins is cut down as shown at 30a so as to form a knife engaging element including a clamping surface 30b and a guide surface 30c. The planing knife 36 is made of any suitable material, for example of a sufficiently hard steel plate, the cutting teeth being sharpened therefrom in appropriate fashion.

In an operation to prepare the material, the preparation is poured into the cylindrical transparent sleeve 16a of plastic material. A large excess H of material is formed at the top of the sleeve and has to be removed before the start of the actual cutting operation. For this purpose, after the knife 18 has been removed the frame 28 is inserted into the holder 22b and clamped by means of the set screw 26. Then the planning knife 36 is engaged with the clamping pins 30 with the clamping section 32 lowered by means of screw 34 so that the spacing between the pins 30 on frame 28 and the pins 30 on section 32 is less than the spacing between shoulders 36b on knife 36. The clamping section 32 is then pivoted upwardly to a small degree in the counter clockwise direction by means of screw 34 so that the two clamping pins 30 on section 32 clamp the planing knife 36 against the fixed pins 30 on the frame 28.

By means of the adjusting device 20 the plane of the planing knife is brought into a position, relative to the longitudinal axis of the preparation, which is suited to the actual microtome cutting which is to be performed later. The holder 14 can now be moved up and down relatively to the fixed planing knife 36 with an appropriate stroke, the excess H of material being removed in layers to such a degree as to leave the preparation 16 clear. Thereupon the frame 28 and the planing knife 36 are removed and the knife 18 inserted. The actual operation of cutting the preparation (in the same angular blade position as when planing took place) can now be performed in known manner.

I claim:

1. A microtome for cutting sections of a preparation encased in a cover comprising a holder for a microtome knife, means on said holder for removably mounting said microtome knife, a preliminary cutting tool for insertion in said holder in place of said microtome knife and provided with a plurality of cutting teeth lying serially in the cutting direction for the purpose of cutting the end portion from said cover prior to cutting sections of the preparation with the microtome knife.

2. A microtome according to claim 1 and further including means for adjusting the position of the microtome knife, said last-named means adapted to adjust the position of the preliminary cutting tool when the latter is mounted in said holder.

3. A microtome according to claim 1 and further including a frame, pins on said frame, said preliminary cutting tool engageable with said pins, said means on said holder for mounting said microtome knife including a T-shaped clamping bar and a groove in said frame engaging said clamping bar.

4. A microtome for cutting sections of a preparation encased in a cover comprising a knife holder, means mounting said knife holder for adjusting movement, a T-shaped clamping bar on said holder, a frame having a groove engaging said clamping bar, a clamping section pivotally mounted on said frame, pins on one face of said frame and said clamping section, a preliminary cutting tool having shoulders engaging said pins to retain said tool on said frame, means for adjusting the angular position of the clamping section on the frame to vary the spacing between the pins on the frame and the pins on the clamping section to securely clamp said tool on the frame.

5. A microtome according to claim 4 wherein said preliminary cutting tool includes a plurality of inclined cutting teeth.

References Cited by the Examiner
UNITED STATES PATENTS

| 775,556 | 11/1904 | Dieckmann | 83—915.5 X |
| 1,765,283 | 6/1930 | Patterson et al. | 83—699 X |
| 2,662,445 | 12/1953 | Jacoby | 83—915.5 X |

WILLIAM W. DYER, Jr., *Primary Examiner.*

F. T. YOST, *Assistant Examiner.*